US005503590A

United States Patent [19]
Saitoh et al.

[11] Patent Number: 5,503,590
[45] Date of Patent: Apr. 2, 1996

[54] POLISHING PLATE FOR OPTICAL FIBER CONNECTOR FERRULE END FACE AND POLISHING APPARATUS THEREFOR

[75] Inventors: Tadao Saitoh, Koganei; Akira Nagayama, Tokyo, both of Japan

[73] Assignee: Nippon Telegraph and Telephone Corporation, Tokyo, Japan

[21] Appl. No.: 230,922

[22] Filed: Apr. 21, 1994

[30] Foreign Application Priority Data

| Apr. 22, 1993 | [JP] | Japan | 5-096282 |
| Apr. 27, 1993 | [JP] | Japan | 5-101585 |
| Apr. 30, 1993 | [JP] | Japan | 5-104748 |

[51] Int. Cl.$^6$ ................................. B24B 11/00
[52] U.S. Cl. ................... 451/11; 451/10; 451/37; 451/41; 451/57; 451/285; 451/398
[58] Field of Search ................ 451/9, 10, 11, 451/36, 37, 41, 54, 55, 57, 60, 266, 267, 283, 285, 287, 548, 397, 398, 402

[56] References Cited

U.S. PATENT DOCUMENTS

| 4,839,993 | 6/1989 | Masuko et al. | 51/129 |
| 5,007,209 | 4/1991 | Saito et al. | 51/283 R |
| 5,349,784 | 9/1994 | Grois et al. | 451/41 |

FOREIGN PATENT DOCUMENTS

| 0352709 | 1/1990 | European Pat. Off. . |
| 55-28058 | 2/1980 | Japan . |
| 59-107857 | 6/1984 | Japan . |
| 59-109452 | 7/1984 | Japan . |
| 60-175568 | 9/1985 | Japan . |
| 63-207552 | 8/1988 | Japan . |
| 207552 | 8/1988 | Japan . |
| 4-24189 | 4/1992 | Japan . |
| 4-244373 | 9/1992 | Japan . |
| 5-7145 | 1/1993 | Japan . |
| 5-16985 | 3/1993 | Japan . |

OTHER PUBLICATIONS

Ohira et al., "Development of Optical Fiber Connector . . . the Polished Surface Damage", pp. 122–125, ASPE 1993 Annual Meeting, Nov. 7–12, 1993.
The Institute of Electronics, Information and Communication Engineers 1993, Session C–249 in Autumn, 1993, "High–Speed High–Precision Optical . . . and Constant Pressure Control", Saito et al., pp. 4–329.
Kenji Uchino, "Piezoelectric/Electrostrictive Actuators", Morikita Publishing, p. 101.

Primary Examiner—Bruce M. Kisliuk
Assistant Examiner—Eileen P. Morgan
Attorney, Agent, or Firm—Spencer & Frank

[57] ABSTRACT

A constant range polishing apparatus for polishing an end face of an optical fiber connector ferrule. The apparatus comprises a polishing plate adapted to be rotated about a polishing plate axis for polishing the end face of the connector ferrule. The polishing plate includes a disc-shaped substrate having a circular surface including an outer ring area, an inner ring area disposed radially inwardly with respect to the outer ring area, and an inner portion disposed radially inwardly with respect to the inner ring area. The polishing plate further includes a ring grinding wheel disposed on the outer ring area for forming an adhesive removing ring area; a first elastic film polisher disposed in a region defined by the inner ring area and at a distance from the surface of the substrate, the first elastic film polisher forming a rough polishing ring area; and a second elastic film polisher disposed in a region defined by the inner portion and at a distance from the surface of the substrate, the second elastic film polisher forming a final polishing ring area. The apparatus further includes: a chuck for holding the connector ferrule at a position opposite the polishing plate, the chuck being rotatable about an axis of the connector ferrule; a mounting substrate disposed for rotatably supporting the chuck; and a drive means for positioning the polishing plate and the mounting substrate relative to one another.

18 Claims, 11 Drawing Sheets

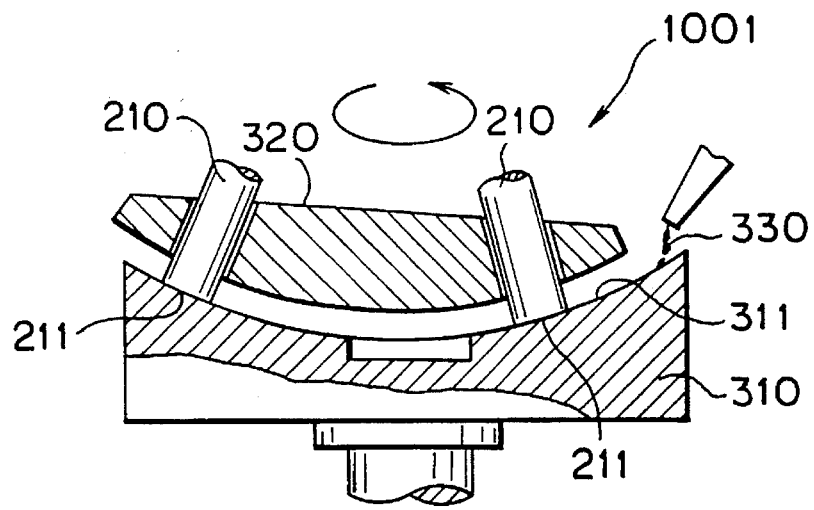
PRIOR ART
FIG. 2
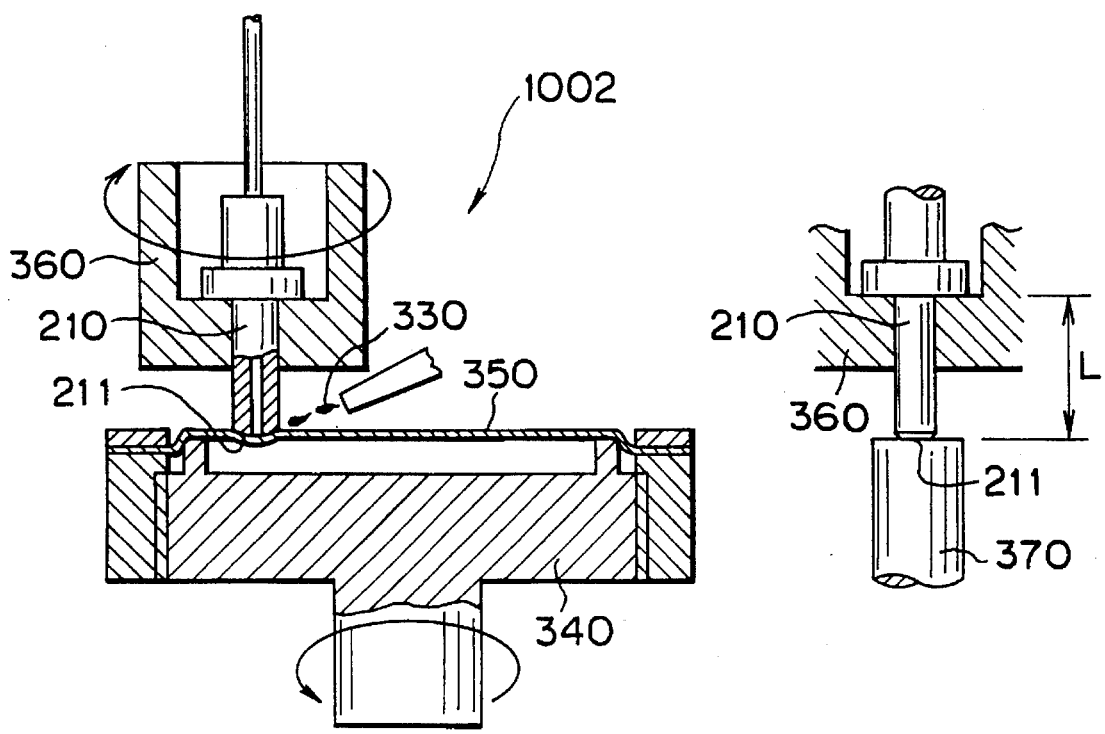
PRIOR ART
FIG. 3A
PRIOR ART
FIG. 3B

POLISHING PLATE FOR OPTICAL FIBER CONNECTOR FERRULE END FACE AND POLISHING APPARATUS THEREFOR

BACKGROUND OF THE INVENTION

1. Field of the Invention

The present invention relates to a polishing plate for polishing an optical fiber connector ferrule end face mounted to a joining part in an optical fiber connector for mechanically connecting optical fibers, and to a constant range control polishing apparatus and a constant pressure control polishing apparatus for the optical fiber connector ferrule end face.

2. Description of the Prior Art

In contrast to fusion splicing for permanently connecting optical fibers, an optical connector is a joining device capable of detachably connecting optical fibers with one another, and there have heretofore been used various types of optical connectors which can easily connect and disconnect optical fibers.

For example, there has been known a single-core optical connector which is intended to achieve connection of optical fibers with reduced eccentricity or angular deviation (e.g. an eccentricity of not more than 1 mm in the case of a ferrule for a single mode optical fiber having a core diameter of 10 mm), and which includes ceramic-made ferrules (reinforcing cylindrical rods for joining), optical fibers whose end positions are inserted and fixed in the ferrules, respectively, and a split sleeve having a precise inner diameter and a slit along the length thereof. The optical connector ferrules are inserted from both ends thereof in the slit sleeve and abut each other, the split sleeve being tightened together with the two ends of the optical connector ferrule.

The optical connector, which has good connection characteristics, is widely used in large amounts, especially in the optical communication field.

The above optical connector is of a type in which the optical connector ferrules are directly abut each other. To improve the optical connection characteristics in these optical connectors, use is made of optical connector ferrules each end of which has a convex-curved surface. The convex-curved shape is formed by polishing. Therefore, the polishing is required to be done with a high precision, and improved workability and operability are needed in the polishing work.

To polish the end face of an optical connector ferrule to form a convex-curved surface, a three-step polishing process as shown in FIG. 1A to FIG. 1D is required. Specifically, initially before polishing, as shown in FIG. 1A, an end face 211 of the ferrule 210 is a flat surface, and a fiber 220 and an adhesive 230 are protruded from the end face 211. End face 211 is polished so as to yield a convex-curved surface by a three-step polishing process shown in FIG. 1B to FIG. 1D. In a first step shown in FIG. 1B, the protruded parts 220 and 230 are removed (hereinafter referred to as adhesive removal) to yield a flat end face. In a second step shown in FIG. 1C, the end face 211 of the flat surface ferrule 210 is polished to yield a convex-curved surface (hereinafter this step being referred to as rough polishing). In a third step shown in FIG. 1D, surface irregularities or a processing strain layer 221 is removed by polishing (hereinafter this step being referred to as final polishing).

Since such a convex-curved shape is achieved by polishing in the current optical connector production, a high-precision polishing machine with improved workability and operability is required.

For ease of understanding, some examples of conventional polishing machines will be explained with reference to FIGS. 2, 3A, 3B, and 4.

Prior Art Example 1

FIG. 2 is a schematic cross sectional view showing a polishing machine according to a first prior art example. In FIG. 2, a polishing machine 1001 is provided for polishing the end face 211 of the optical connector ferrule 210 (hereinafter simply referred to as ferrule) to have a convex-curved shape. The polishing machine 1001 comprises a polishing plate 310 having a concave-curved polishing surface 311, and a ferrule holder 320 mounted thereon. The ferrule holder 320 holds at least three ferrules 210 (only two being shown) arranged perpendicularly with respect to the concave-curved surface 311 of the polishing plate 310. In polishing, the ferrule holder 320 undergoes precession movement utilizing the weight of the ferrule holder 320 as a polishing pressure while supplying the polishing surface 211 of the rotating polishing plate 310 with an abrasive liquid 330, thereby polishing the ferrule end face 211.

Prior Art Example 2

FIG. 3A shows a schematic cross sectional view of a polishing machine according to a second prior art example, and FIG. 3B a schematic cross sectional view showing the ferrule being attached to the polishing machine shown in FIG. 3A. As shown in FIG. 3A, a polishing machine 1002 has a rotary polishing surface 340, which is provided with a resin film 350 under a constant tension. The polishing machine 1002 polishes a ferrule 210 from which adhesive 230 is previously removed. Further, before polishing, as shown in FIG. 3B, it is necessary that the end face 211 of the ferrule 210 be pressed against a block 370 previously placed at a different position while the ferrule 210 is being held by a chuck 360 so that a concave set of the end face 211 of the ferrule 210 into the film 350 at the polishing position is a constant value L. In polishing, the ferrule 210 is rotated in the forward and reverse sense about its axis while supplying the abrasive liquid 330 on top of the rotating constant-tension film 350, and is further given a precession movement to move the contact position with the film 350.

Prior Art Example 3

FIG. 4 is a schematic cross sectional view showing a polishing machine according to a third prior art example. In FIG. 4, a polishing machine 1003 has a rotary polishing plate 380, which is provided with a polishing sheet 392 or the like on the top surface of an elastic member 391 such as rubber. The ferrule 210, mounted on a ferrule mounting piece 400 is pressed by a spring 410 against the polishing sheet 392. In polishing, the end of the ferrule 210 is pressed against the polishing plate 380 while supplying the abrasive liquid 330 on the top surface of the rotating and swinging polishing plate 380, thereby polishing the end face 211 of the ferrule 210.

The above described polishing machines 1001, 1002, and 1003 of the first to third prior art examples present problems as will be explained below.

When polishing is performed using the first prior art example polishing machine 1001, there must be used a plurality of polishing machines 1001 with different polishing surfaces 311 for the individual steps. Therefore, each step requires mounting and removing the ferrule 210 with respect to the holder 320, thus requiring troublesome work. Further, use of a plurality of polishing machines is disadvantageous in terms of cost.

In polishing with the second prior art example polishing machine 1002, since the adhesive must be removed manually using an adhesive removing tool or the like, the machine is poor in workability. Further, in the rough polishing steps, and final polishing using abrasive liquids 330 of different particle sizes, separate polishing machines must be used in order to prevent the abrasive liquids 330 from mixing with one another. Therefore, this machine requires a troublesome amount of work associated with mounting and removing the ferrule 210 with respect to the polishing machines. Further, use of two polishing machines results in an increased costs for the polishing process.

In polishing by the third prior art example polishing machine 1003, a plurality of polishing plates 380 differing in particle size must be used for the individual steps. Further, the polishing plate 380 must be exchanged every time the process proceeds to a different step. Normally, in this type of polishing machine, in order to reduce the time for rough polishing, the rough polishing step is further divided into two to three substeps in which a set of polishing sheets 392 with different particle sizes are used to polish the ferrule 210. Therefore, it is necessary to use the polishing plates 380 with different particle sizes for the individual substeps, thus requiring a troublesome amount of work.

Moreover, in view of polishing accuracy, the prior art polishing machines have involved problems as will further be explained below.

When polishing with the first prior art example polishing machine 1001, it is necessary to set constant relative distances between the respective end faces 211 of the ferrules 210 and the polishing surface 311 of the polishing plate 310 to prepare precise convex-curved surfaces uniformly; variations in length of the ferrules 210 mounted on the ferrule holder 320 largely affect the relative distances and cause polishing errors and adversely effect the polishing precision. More specifically, the length of each ferrule 210 inherently has a production error of several tens of μm in the longitudinal direction even in the initial condition, and a once-polished ferrule has a maximum polishing error of 0.1 to 0.2 mm which causes problems in repolishing. Further, it is necessary to mount manually the ferrule 210 to the ferrule holder 320 using a special tool in order to flush the end positions of three or more ferrules 210, requiring a troublesome amount of work during polishing.

When polishing with the second prior art example polishing machine 1002, since normally a curvature radius of the end face 211 of the ferrule 210 of approximately 20 mm is appropriate in view of optical connection characteristics of the optical connector, the polishing machine 1002 is designed such that the curvature radius of the end face 211 of the ferrule 210 can be controlled by specifying the concave set of the end of the ferrule 210 in the film 350. FIG. 5 is a graph illustrating the relationship between the concave set in the polishing machine and the curvature radius. From FIG. 5, it can be seen that if the concave set of the curvature ferrule 210 is varied by only 50 μm, the radius of the end face 211 is varied by 5,000 μm. Further, the concave set of the ferrule 210 has a very small dimension, on the order of only several hundred μm.

Therefore, even with an end position error of the ferrule 210 of several tens of μm, a concave pressure onto the film 350 is varied, which directly results in a change in the curvature radius of the end face 211. Therefore, to obtain a radius of the end face 211 for achieving a good optical connection condition, it is necessary to control a very small concave set of about 0.3 mm with a precision of several tens of μm. Therefore, where manual work must be done for holding the ferrule 210 on a chuck 360 on the block 370, extreme care must be used to tighten the chuck 360 so that the ferrule 210 is not dislocated, which requires a troublesome amount of work in polishing under conditions where the polishing precision is deteriorated.

Also the third prior art example polishing machine 1003 is designed so that the radius of the end face 211 of the ferrule 210 can be controlled by specifying the concave set of the end face 211 of the ferrule 210 into the elastic member 391. Therefore, as in the polishing machine 1002, even an end position error of several tens of μm of the ferrule 210 varies the concave pressure into the elastic member 391, leading directly to a change in the radius of the end face 210. Therefore, to obtain a radius of the end face 211 for achieving a good optical connection condition, it is necessary to control a very small concave set of about 0.3 mm with a precision of several tens of μm. However, since the polishing machine 1003 generates the concave set of the ferrule 210 by a deflection force of the spring 410, the deflection force tends to be varied when the end position of the ferrule 210 has an error as described above, and, hence, the variation in the deflection force results in variation in the curvature radius.

SUMMARY OF THE INVENTION

A primary object of the present invention is to provide a polishing plate for an optical fiber connector ferrule end face which can polish a ferrule end face with good workability.

Another object of the present invention is to provide a low-cost polishing plate which can polish a ferrule end face with good workability and which has arranged thereon an adhesive removing portion, a rough polishing portion, and a final polishing portion on the polishing plate concentrically from the outer periphery toward the center polishing by the different portions beings effected by merely shifting the position of the ferrule to be polished.

A further object of the present invention is to provide a polishing apparatus for polishing an optical fiber connector ferrule end face which can polish a ferrule end face with good workability, good reproducibility, and high precision.

Since, in the polishing plate of the present invention, the adhesive removing ring area, the rough polishing ring area, and the final polishing ring area are dividedly placed concentrically on the polishing plate surface from the outer periphery toward the center, the ferrule end face can be polished with good workability merely by shifting the position of the ferrule to be polished little by little towards the center.

Further, in the polishing plate of the present invention, the rough polishing ring area and the final polishing ring area are separated by a parallel division ring projection and a parallel partition ring projection to prevent mixing of abrasive liquids supplied to different polishing ring area, and each of the abrasive liquids is dropped onto the outer periphery of the parallel partition ring projection to disperse the abrasive liquid evenly on the polished surface by a centrifugal force of rotation, thereby improving the polishing efficiency.

In the polishing plate of the present invention as described above, the pressing face of the ferrule against the elastic member on the polishing surface can be detected by a strain detector, the moving distance of the drive unit can be detected by a moving distance detecting circuit and, even though there are errors in the ferrule holding position and length, the pressing face can be maintained at a constant value by the initial position detector. Therefore, even though there occur errors in the holding position and length at the ferrule end, a high-precision convex-curved ferrule end face can be obtained with good reproducibility.

In the constant pressure control polishing apparatus of the present invention, by the constant pressure control mechanism comprising the chuck and the chuck rotation mechanism, and the rectilinear drive mechanism comprising, for example, a VCM (voice coil motor), directly connected to the constant pressure control mechanism, the ferrule end mounted to the chuck on the constant pressure control mechanism is pressed against the rotating polishing surface, and at the same time the ferrule is rotated by the chuck rotation mechanism to polish the ferrule end.

During polishing, since the ferrule concave force on the polishing surface of the constant pressure control mechanism driven by the rectilinear drive mechanism can be maintained at a constant value within a tolerable range of errors in ferrule holding and length, even though there are holding or length errors at the ferrule end, a precision convex-curved ferrule end face can be obtained with good repeatability.

The above and other objects, effects, features and advantages of the present invention will be become more apparent from the following description of embodiments thereof taken in conjunction with the accompanying drawings.

BRIEF DESCRIPTION OF THE DRAWINGS

FIG. 2 is a schematic cross sectional view showing a polishing machine according to a first prior art example;

FIG. 3A is a schematic cross sectional view showing a polishing machine according to a second prior art example;

FIG. 3B is a schematic cross sectional view showing a ferrule set for use in the prior art polishing machine shown in FIG. 3A;

DETAILED DESCRIPTION OF PREFERRED EMBODIMENTS

Hereinafter, the different embodiment of the present invention will be described in more detail. However, the present invention should not be deemed as being limited to those embodiments.

Embodiment 1

A first embodiment of the polishing plate of the present invention will be described with reference to the drawings.

Figure 6:
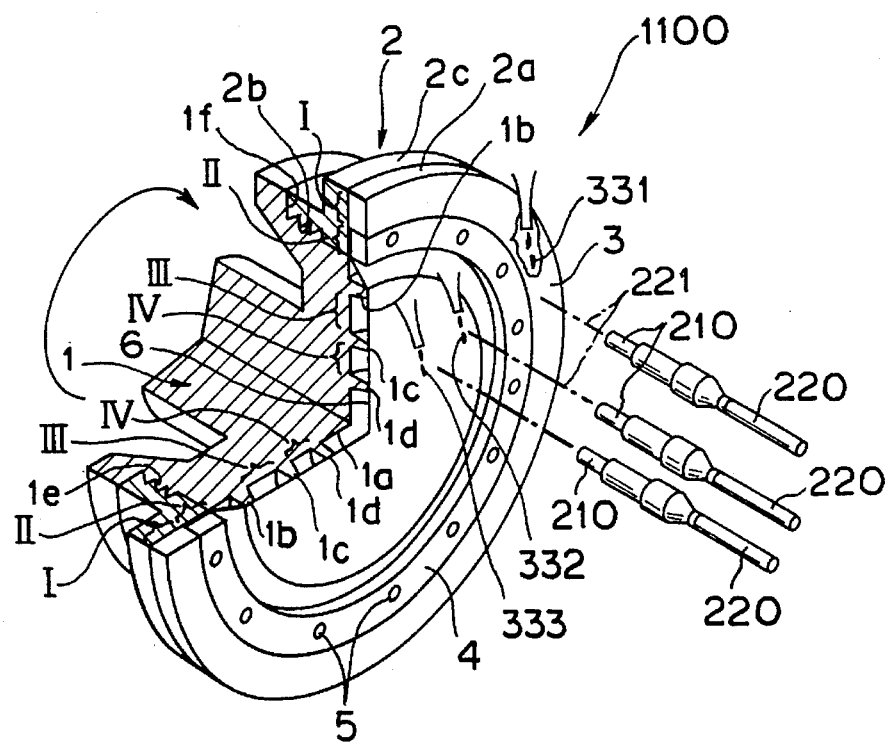
FIG. 6 is a schematic cutaway perspective view showing a polishing plate according to a first embodiment of the present invention.

FIG. 6 is a schematic partly cutaway perspective view of the polishing plate of the first embodiment. Similar reference numerals are used for similar parts in the first to third prior art examples shown in FIGS. 2 to 4.

Referring to FIG. 6, a connector ferrule end polishing plate 1100 of the first embodiment has a first ring area I for removing adhesive, a second ring area II for holding the outer periphery of a film polisher, a third ring area III for rough polishing, and a fourth ring area IV for final polishing, and is provided with a circular polishing plate or disc shaped substrate 1, a cylindrical polishing plate 2, a ring grinding wheel 3 for adhesive removal, a ring member 4 for holding the outer periphery of the film polisher, retaining screws 5, and an elastic film polisher 6. The circular polishing plate 1 has a polishing surface including an inner polishing surface 1a, and a stopper 1f which is a flange portion one step lower than the inner polishing surface 1a. The inner polishing surface 1a is provided with first to third ring projections 1b, 1c, and 1d which are annular projections arranged concentrically in this order from the outside to the inside of the surface 1a, that is successively radially inwardly with respect to one another. Further, the outer peripheral surface of the circular polishing plate 1a is formed of a male screw 1e. On the other hand, the cylindrical polishing plate 2 has a flange portion 2c supporting an outer polishing surface 2a of a ring grinding wheel 3, and the inner peripheral surface is formed of a female screw 2b engaging with the male screw 1e of the circular polishing plate 1. To the outer polishing surface 2a of the cylindrical polishing plate 2, is fixed the ring grinding wheel 3. The elastic film polisher 6 is provided so as to cover the inner polishing surface 1a of the circular polishing plate 1 on an inner opening of the cylindrical polishing plate 2 in such a manner that the film can be in contact with the peaks of the first to third ring projections 1b to 1d, and the outer periphery is fixed between the cylindrical polishing plate 2 and the ring member 4. The ring member 4 is retained with the retaining screws 5 on the inside of the flange portion 2c of the cylindrical polishing plate 2.

The polishing plate 1100 of the first embodiment is constructed as follows.

First, the elastic film polisher 6 is retained with the retaining screws 5 on the cylindrical polishing plate 2 along the periphery of the film polisher 6 through the ring member 4.

Then, the female screw 2b of the cylindrical polishing plate 2 to which the elastic film polisher 6 has been attached is screwed into the male screw 1e on the outer periphery of the circular polishing plate 1. This causes the elastic film polisher 6 to contact the peaks of the first to third ring projections 1b, 1c, and 1d. When the screw 2b is further screwed in, the ring member 4 sinks in the direction of the inner polishing surface 1a of the circular polishing plate 1 relative to the peak of the ring projection 1b. This causes the elastic film polisher 6 to be pulled by the first ring projection 1b and given a tensile force. As a result, the elastic film polisher 6 is spread over the inner polishing surface 1a under tension. The screw 2b is further screwed in until the leading end in the screwing direction of the cylindrical polishing plate 2 comes into contact with the stopper 1f of the outer periphery of the circular polishing plate 1 to assemble the polishing plate 1100 of the present embodiment.

The polishing procedure of the first embodiment will be described according to the steps (1), (2), and (3) shown below.

The polishing plate 1100 of the first embodiment is rotated by a motor (not shown), and the ferrule 210 is gripped by a holder (not shown) and rotated about an axis 221, and can be moved (swung) in the direction of the axis 221 and in the horizontal direction perpendicular to the axis 221.

(1) Adhesive removal

Figure 1A:
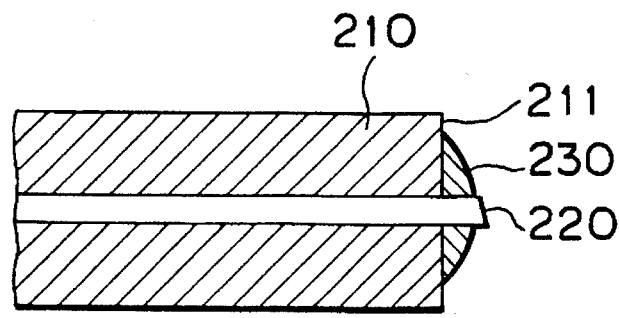
FIG. 1A is a schematic cross sectional view showing the shape of a ferrule end face prior to polishing.
Figure 1B:
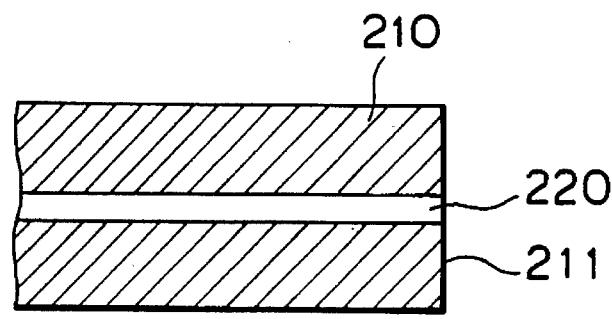
FIG. 1B is a schematic cross sectional view showing the shape of a ferrule end face after an adhesive removal polishing step of the ferrule of FIG. 1A.
Figure 1C:
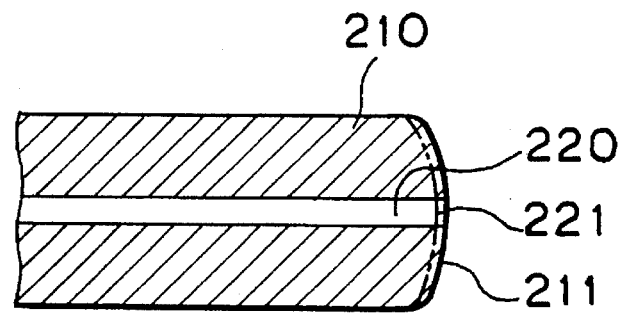
FIG. 1C is a schematic cross sectional view showing the shape of a ferrule end face after a rough polishing step of the ferrule of FIG. 1B.
Figure 1D:
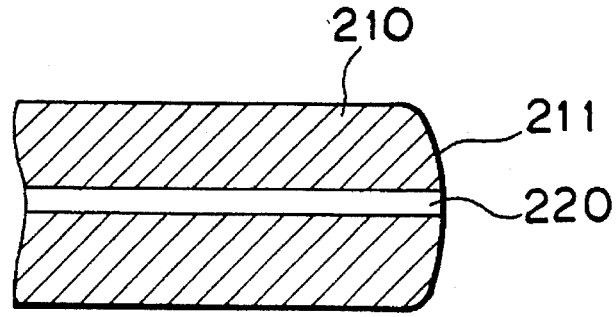
FIG. 1D is a schematic cross sectional view showing the shape of a ferrule end face after a final polishing step of the ferrule of FIG. 1C.

A diamond grinding wheel is used as the adhesive removing ring grinding wheel 3. While supplying an abrasive liquid 331, the ferrule 210 in the initial condition is gradually pressed against the adhesive removing ring grinding wheel 3 in the first or outer ring area I of the polishing surface of the polishing rotating plate 1100 to make a cut until the ferrule 210 end face is ground very slightly to remove fiber 220 and adhesive 230 projecting from the end face 211 of the ferrule 210 (FIG. 1A). Then, the ferrule 210 is separated from the adhesive removing ring grinding wheel 3.

(2) Rough polishing

After the ferrule 210 is moved to a position opposing the third or inner ring area III for rough polishing by the elastic film polisher 6, a rough polishing abrasive liquid 332 is supplied and, while rotating the ferrule 210, the end of the ferrule is pushed by a predetermined amount into the rotating elastic film polisher 6 in the third ring area III. Thereafter, the ferrule 210 is polished to yield a convex-curved surface having a curvature radius corresponding to an elastic deformation amount of the elastic film polisher 6. This rough polishing is for polishing the flat end face 211 of the ferrule 210 to yield a convex-curved spherical surface, and, hence, uses the polishing abrasive liquid 332 containing relatively coarse polishing particles. After the completion of polishing, the ferrule 210 is separated from the polishing surface.

(3) Final polishing

After the ferrule 210 is moved to a position opposing the fourth ring area IV for final polishing of the elastic film polisher 6, a final polishing abrasive liquid 333 is supplied and, while rotating the ferrule 210, the end of the ferrule is pushed by a predetermined amount into the rotating elastic film polisher 6 in the fourth ring area IV. Final polishing polishes the convex-curved spherical surface already polished by rough polishing to yield a mirror surface, or remove any damaged layer, and, hence use is made of the polishing abrasive liquid 333 containing fine particles of 1 μm or less. After the completion of polishing, the ferrule 210 is separated from the polishing surface to complete final polishing of the end face 211 of the ferrule 210.

Embodiment 2

A second embodiment of the present invention will be described with reference to the drawings.

Figure 7:
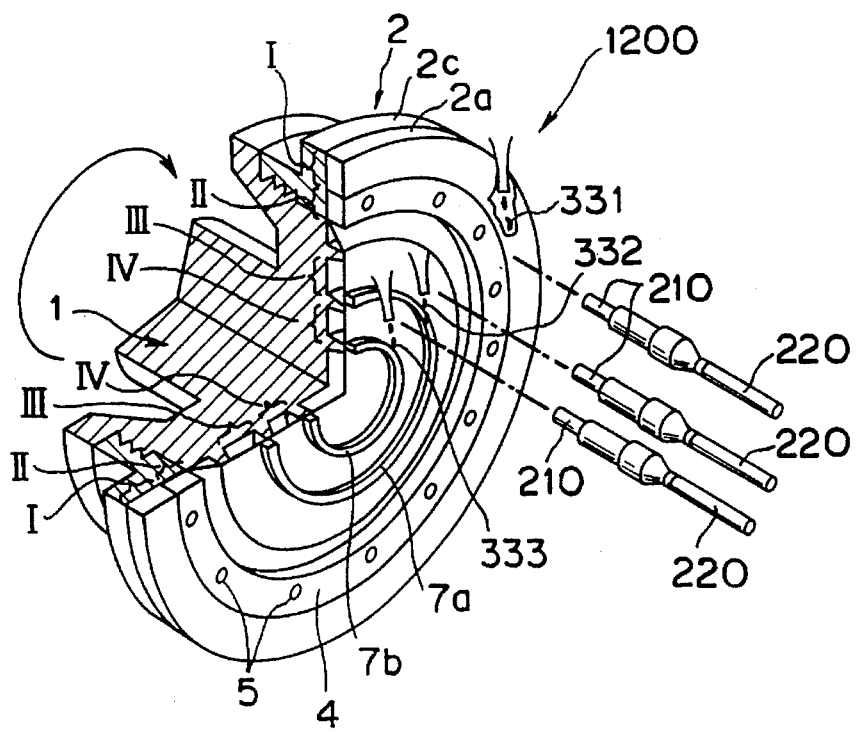
FIG. 7 is a schematic cutaway perspective view showing a polishing plate according to a second embodiment of the present invention.

FIG. 7 is a schematic partly cutaway perspective view of the polishing plate of the present embodiment.

The optical fiber connector end face polishing plate 1200 of the second embodiment is the same as the first embodiment of the present invention except that first and second partition rings 7a and 7b are disposed and bonded concentrically at positions corresponding to the second and third ring projections 1c and 1d of the polishing surface of the elastic film polisher 6.

Since the polishing plate 1200 of the present embodiment is assembled in the same manner as in the first embodiment of the present invention, detailed description thereof is omitted here. The partition rings 7a and 7b are bonded to the surface of the elastic film polisher 6 after the film is spread over the inner polishing surface 1a.

The polishing procedure of the present embodiment will be described according to the steps (1), (2), and (3) shown below.

(1) Adhesive removal

The adhesive 230 is removed in the same manner as in the first embodiment of the present invention, and description thereof is omitted here.

(2) Rough polishing

As in the first embodiment of the present invention, after the ferrule 210 is moved to a position opposing the rough polishing ring area of the elastic film polisher 6, the rough polishing abrasive liquid 332 is supplied and, while rotating the ferrule 210, its end is pushed by a predetermined amount into the rotating elastic film polisher 6 in the third ring area III. After this, the ferrule 210 is polished to have a convex-curved surface having a radius corresponding to an elastic deformation amount of the elastic film polisher 6.

At this moment, the rough polishing abrasive liquid 332 is supplied in the vicinity of the outer periphery of the third partition ring 7a. This causes the rough polishing abrasive liquid 332 to be evenly dispersed on the entire surface of the third ring area III by the centrifugal force of rotation, thereby polishing the ferrule 210 efficiently. Further, the parallel partition ring projection 7a prevents the rough polishing abrasive liquid 332 from migrating into the final polishing ring area IV.

(3) Final polishing

After the ferrule 210 is moved to a position opposing the fourth ring area IV for final polishing of the elastic film polisher 6, the final polishing abrasive liquid 333 is supplied and, while rotating the ferrule 210, its end is pushed by a predetermined amount into the rotating elastic film polisher 6 of the fourth ring area IV.

At this moment, the final polishing abrasive liquid 333 is supplied in the vicinity of the outer periphery of the second partition ring 7b. This causes the final polishing abrasive liquid 333 to be evenly dispersed on the entire surface of the fourth ring area IV by the centrifugal force of rotation, thereby polishing the ferrule 210 efficiently.

As described above, the polishing plate according to the present invention, featured by a concentric arrangement of the adhesive removing portion, the rough polishing portion, and the final polishing portion, sectioned corresponding to the adhesive removing ring area, rough polishing ring area, and the final polishing ring area, respectively, which are separately disposed concentrically from the outer peripheral side in the polishing plate surface, has the following effects:

(1) the ferrule or polishing plate need not be replaced where the polishing step is changed. This improves the workability and reduces the polishing time;

(2) since the three steps of adhesive removal, rough polishing, and final polishing can be achieved merely by shifting the position of the ferrule to be polished, the process is suitable for automatic polishing;

(3) use of the partition rings prevents migration of abrasive liquids between the polishing ring areas and improves spreading of the abrasive liquid onto the polishing surface. As a result, the same polishing effect is obtained as where the polishing plate surface is disposed horizontally, even though the polishing plate surface is disposed vertically. The above leads to expansion of flexibility in the application of the polishing apparatus.

In the above-described second embodiment in addition to the first partition ring 7a for separating the rough polishing portion and the final polishing portion, the second partition ring 7b is provided inside the final polishing portion. The first and second partition rings 7a and 7b, when being supplied with abrasive liquid along their outer peripheral surfaces, prevent the abrasive liquid from spattering back, and enable uniform supply of the abrasive liquid over the entire polishing area. When the above effect does not have to be achieved, the second partition ring 7b is not necessarily required. Further, since the inside of the second partition ring 7b is not used for polishing, a disk covering the entire inside area of the final polishing area may be bonded to the polishing surface of the film polisher 6 instead of the partition ring 7b.

Constant range control polishing apparatus

An embodiment of the polishing apparatus of the present invention will be described below. The following polishing apparatus, when using the above-described polishing plate, allows effective operation of the polishing plate and, on the other hand, also provides a sufficient effect of the apparatus which will be described later, so that the ferrule end face can be polished with improved workability and high precision. In the following description, the present embodiment will be described as using the prior art polishing plate with an elastic film polisher as a polishing plate but, needless to say, the above polishing plate of the present invention can also be used as well in place of the prior art polishing plate.

Embodiment 3

Figure 8:
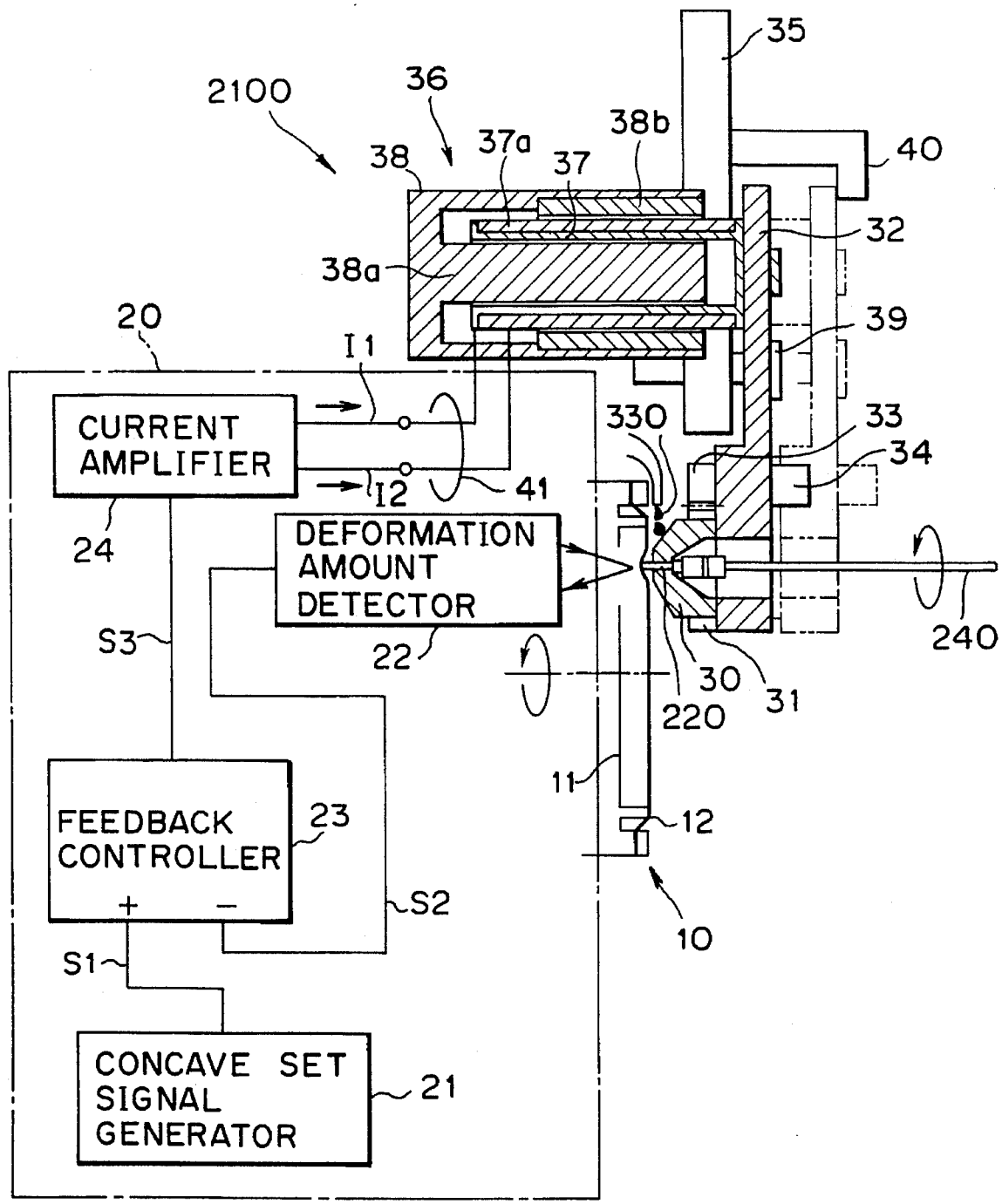
FIG. 8 is a schematic cutaway view showing a constant range control ferrule end polishing apparatus according to a third embodiment of the present invention.

FIG. 8 is a partly cutaway schematic cross sectional view showing a constant range control ferrule end face polishing apparatus of the present embodiment with a diagram for an electric circuit for controlling the apparatus being also shown. Referring to FIG. 8, a polishing plate 10 is provided with an elastic film polisher 12 spread with a constant tension on the surface of a circular polishing plate 11, and rotated by a rotary shaft of a motor (not shown) mounted on a polishing table (not shown). A chuck 30 for holding a ferrule 220 is disposed at a position opposing the polishing plate 10. The chuck 30 has an outer gear 31 on its outer periphery, and is rotatably supported on one end of a slide substrate 32. Further, a pinion 33 engaging with an outer gear 31 of the chuck 30 is mounted on a rotary shaft of a motor 34 mounted on the slide substrate 32. Therefore, the chuck 30 is rotated by driving the motor 34. On the other hand, the other end of the slide substrate 32 is mounted to an end of a bobbin 37 which is a cylindrical moving part of a voice coil motor 36 as a rectilinear drive unit mounted on a mounting substrate 35 mounted on the polishing table (not shown). Here, the voice coil motor 36 has a cylindrical casing 38 which is mounted to the mounting substrate 35 and support the above bobbin 37 movable in the right and left directions in FIG. 8. The casing 38 has an iron core 38a serving as an axis guide projecting at an inside center and a ring-formed magnet 38b provided on the inner periphery of the cylinder, thus forming a magnetic circuit. On the other hand, the bobbin 37 has an outer peripheral coil 37a, which is engaged with and guided by the iron core 38a. Therefore, the bobbin 37 is moved in the right and left direction in the FIG. 8 by a current applied to the coil 37a. Further, an end of a slide shaft 39 is mounted on the other end of the slide substrate 32, and the other end of the slide shaft 39 penetrates the mounting substrate 35 and is supported movably in the axial direction on the mounting substrate 35. Further, the mounting substrate 35 is provided with a hook-shaped stopper 40 for limiting an excessive movement of the slide substrate 32 to the left in the FIG. 8.

On the other hand, a slide control system 20 for controlling a concave set from the end of the ferrule 220 to the elastic film polisher 12 is provided within a polishing table (not shown). The control system 20 comprises a concave signal generator 21 for generating a standard or predetermined concave set signal S1 for regulating the concave set of the ferrule 220, a deformation amount detector 22 for detecting a deformation amount of the elastic polishing sheet 12 by the concave force of the ferrule 220 to generate a deformation amount signal, a feedback controller 23 for subtracting a deformation amount signal S2 from the concave set signal S1 and to generate a feedback signal S3, and a current amplifier 24 for amplifying the feedback signal S3. Further, the current amplifier 24 and the coil 37a of the bobbin 37 are connected with a drive line to flow a drive current I1 or I2 from the current amplifier 24 into the coil 37a.

Operation of the above constructed polishing apparatus 2100 of the third embodiment will be described with reference to the drawings.

First, the slide substrate 32 attaches and detaches the ferrule 220 to and from the chuck 30 at a position (hereinafter referred to as retreat position) indicated by the two-dot chain in FIG. 8. In order to move the slide substrate 32 to the retreat position, the concave set signal S1 (an electrical signal corresponding to a moving distance to the retreat position) is sent to the feedback controller 23, the feedback controller 23 sends the feedback signal S3 to the current amplifier 24, and the drive current I1 or I2 amplified by the current amplifier 24 is applied to the coil 37a of the rectilinear drive unit 36 through the drive line. The above results in the protrusion of the bobbin 37, which causes the integral pressing of the slide substrate 32 against the hook-shaped stopper 40 mounted on the mounting substrate 35.

Since the deformation amount of the elastic film polisher 12 is zero when the slide substrate 32 is at the retreat position, the amount of deformation detected by the deformation amount detector 22, for example, utilizing the principle of triangulation, is zero, and does not affect the retreat operation. At the retreat position, the ferrule 220 bonded to the end of an optical cable 240 is inserted into the chuck 30 so that the ferrule 220 can be clamped by the chuck 30.

Thereafter, the concave set signal S1 (an electrical signal corresponding to a specified reference concave force) from the concave set signal generator 21 is generated. The deformation amount signal S2 of the deformation detector 22 is subtracted from the concave set signal S1 by the feedback controller 23c, and the result is sent as the feedback signal S3 to the current amplifier 24, and is applied as the drive current I1 or I2 to the coil 37a through the drive line 25.

Since the deformation amount of the elastic film polisher 12 is now zero, a current to move the slide substrate 32 in the direction of the elastic film polisher 12 flows through the drive line 25 to place the chuck in its working position, the ferrule 220 moves in the direction of the elastic film polisher 12 and, ultimately, the end of the ferrule 220 comes in contact with the elastic film polisher 12. As a result, the end of the ferrule 220 is pushed toward the elastic film polisher 12 to a position where the force generated by the cylindrical moving part of the rectilinear drive unit 21 is balanced with an opposite force generated by the elastic deformation of the elastic film polisher 12.

Since the elastic film polisher 12 is deformed by the concave face of the ferrule 220, an output value of the deformation amount signal S2 of the deformation amount detector 22 increases and, as the deformation amount of the elastic film polisher 12 increases, an output of the current amplifier 24 decreases through the feedback signal S3 of a subtraction difference output of the feedback controller 23. Since detection sensitivity of the deformation amount detector 22 is adjusted to be equal to the concave set signal S1, the point where the deformation amount signal S2 and the concave set signal S1 are equal to each other means that the deformation of the elastic film polisher 12 is at a desired amount.

At this point, the polishing plate 10 is rotated, the chuck 30 is rotated by the motor 34, and an abrasive liquid 330 is supplied. As a result, the end face of the ferrule 220 is polished to have a convex-curved shape.

Embodiment 4

Figure 9:
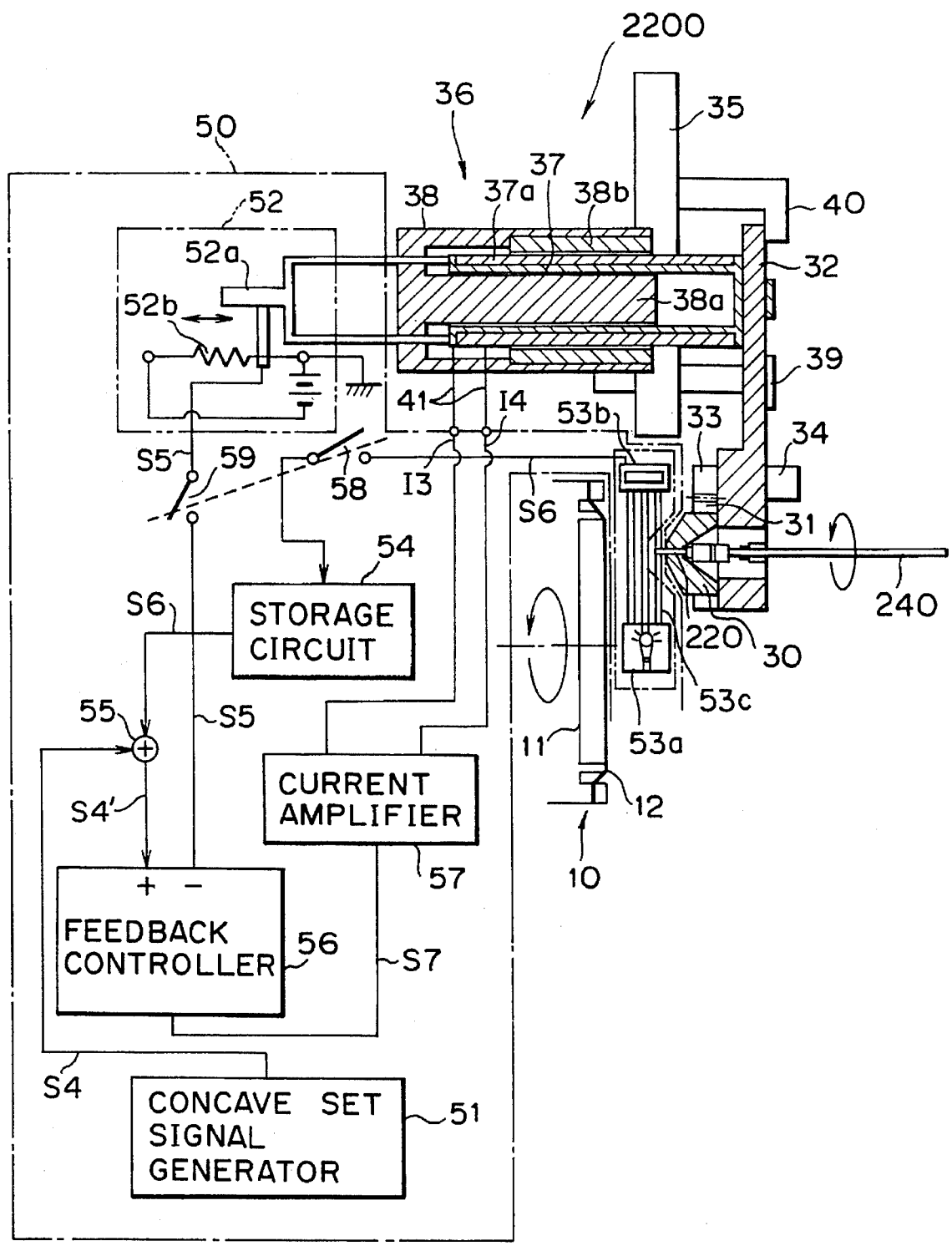
FIG. 9 is a schematic cutaway view showing a constant range control ferrule end polishing apparatus according to a fourth embodiment of the present invention.

FIG. 9 is a partly cutaway schematic view showing the constant range control ferrule end face polishing apparatus 2200.

The apparatus of the fourth embodiment differs from the apparatus of the third embodiment in that it has a slide control system 50 for controlling the concave set of the ferrule 220 to the elastic film polisher 12 to a correct value even though there is an error in the mounting position of the ferrule 220 to the chuck 30. Similar parts to those used in the third embodiment are indicated by similar reference symbols, and detailed description thereof is omitted here.

The slide control system 50 of the fourth embodiment comprises a concave signal generator 51 for generating a concave set signal S4 to specify the concave set of the ferrule 220, a moving distance detector 52 for detecting the moving distance of the bobbin 37 and generating a moving distance signal S5, an initial position detector 53 for detecting the initial position of the ferrule end and generating an initial position signal S6, a storage circuit 54 for storing the initial position signal S6 and outputting the stored initial position signal S6, an adder 55 by adding the concave set signal S4 and the initial position signal S6 and generating a corrected concave set signal S4', a feedback controller 56 for receiving the concave set signal from the adder 55 and the moving distance signal S5 and subtracting the moving distance signal S5 from the corrected concave set signal S4' to generate a feedback signal S7, and a current amplifier 57 for amplifying the feedback signal S7.

In this case, the moving distance detector 52 comprises a moving member 52a which is mounted to the bobbin 37 and moved together with the bobbin 37, and a position detecting unit 52b for detecting the position of the moving member 52a as an electrical signal to obtain the moving distance signal. While various devices can be used as the position detector 52, the present embodiment uses a potentiometer which varies the resistance of a variable resistor according to the moving distance of the moving member 52.

While various types of detectors can be used as the initial position detector 53, the present embodiment uses an optical type detector comprising a light emitter 53a and a light receiver 53b. The light emitter 53a uses a semiconductor laser having a large elliptic ratio, and light from the laser is converted by an optical system to a wide parallel light 53c. The wide parallel light 53c is partly blocked by the ferrule 220 and projected toward the light receiver 53b. Since the present embodiment uses a one-dimensional CCD for the light receiver 53b, the blocking amount (corresponding to the positional error of the ferrule 220) of the ferrule 220 can be detected as a digital value. The positional error of the ferrule 220 is stored in the storage circuit 54.

Operation of the polishing apparatus of the fourth embodiment will be described below with reference to the drawings.

As in the above described third embodiment, the slide substrate 32 detaches the ferrule 220 from the chuck 30 at the position shown in FIG. 9. Before that, in order to move the slide substrate 32 to the retreat position, the concave set signal S1 (an electrical signal corresponding to the moving distance to the retreat position) is sent from the concave set signal generator 51 to a feedback controller 56.

The feedback controller 56 sends the feedback signal S7 to the current amplifier 57, and a drive current I3 or I4 amplified by the current amplifier 57 is applied to the coil 37a of the rectilinear drive unit 36 through the drive line 41. The above causes the bobbin 37 to slide to press the slide substrate 32 against the hook-shaped stopper 40 mounted on the mounting substrate 35.

Since switches 58 and 59 are open when the slide substrate 32 is at the retreat position, the moving distance signal S5 and the initial position signal S6 do not affect the retreat operation. At this moment, the detected amounts from the moving distance detecting circuit 52 and the initial position detector 53 are zero. At the retreat position, the ferrule 220 bonded to the end of an optical cable 240 is inserted into the chuck 30 so that the ferrule 220 can be clamped by the chuck 30.

Thereafter, the switch 58 is closed to detect and store a positional error (deviation of the position of the ferrule 220 from the normal ferrule clamp position) of the ferrule 220 at the time of clamping. The positional error of the ferrule 220 is detected by the initial position detector 53 and stored as the initial position signal S6 in the storage circuit 54.

Further, the switch 59 is closed to generate the concave set signal S4 (an electrical signal corresponding to the specified concave force) from the concave set signal generator 51. The moving distance signal S5 transmitted from the moving distance detector 52 is subtracted from the corrected concave set signal S4, and the result is sent as the feedback signal S7 to the current amplifier 57, and applied as the drive current I3 or I4 to the coil 37a of the rectilinear drive unit 36 through the drive line 41.

Since the moving distance of the slide substrate 32 is now zero, the coil 37a of the rectilinear drive unit 36 is supplied with drive current I3 or I4 to move the slide substrate 32 in the direction of the elastic film polisher 12. The ferrule 220 moves in the direction of the elastic film polisher 12 and, ultimately, the end of the ferrule 220 comes in contact against the elastic film polisher 12. As a result, the end of the ferrule 220 is pressed against the elastic film polisher 12 to begin elastic deformation of the film 12.

On the other hand, the moving distance of the slide substrate 32 is detected as the moving distance signal S5 by the moving distance detector 52. The moving distance signal S5 is conducted to the feedback controller 56. That is, output of the moving distance detector 52 increases and, as the deformation amount of the elastic film polisher 12 increases, output of the current amplifier 57 decreases through the feedback signal S7 of the subtraction difference output of the feedback controller 56. Since the detection sensitivity of the moving distance detector 52 is adjusted to be equal to the concave set signal S4, the point where the moving distance signal S5 is equal to the concave set signal S4 means that the deformation amount of the elastic film polisher 12 is at a desired value.

However, since there is a positional error of the ferrule 220 when the ferrule 220 is inserted into the chuck 30, the error must be corrected. In the present embodiment, the correction is achieved using a position of the ferrule 220 at the time of insertion of the ferrule 220 stored in the storage circuit 54. That is, a negative polarity positional error when the ferrule 220 is inserted into the chuck 30 at a position closer to the elastic film polisher 12 than a normal position, or a positive polarity positional error when the ferrule 220 is inserted into the chuck 30 at a position farther relative to the elastic film polisher 12 than the normal position, is stored as the initial position signal S6 in the storage circuit 54.

Therefore, since the concave set signal S4 outputted from the adder 55 is corrected by the initial position signal S6 outputted from the storage circuit 54, the feedback controller 56 is inputted with the concave set signal S4' corrected by the positional error of the ferrule 220. Therefore, the slide substrate 32 is moved to the corrected position due to the above-described action.

At this moment, the polishing plate 11 is rotated, the chuck 30 is rotated through the motor, and an abrasive liquid (not shown) is supplied to polish the end face of the ferrule 220 to a convex-curved shape.

Figure 4:
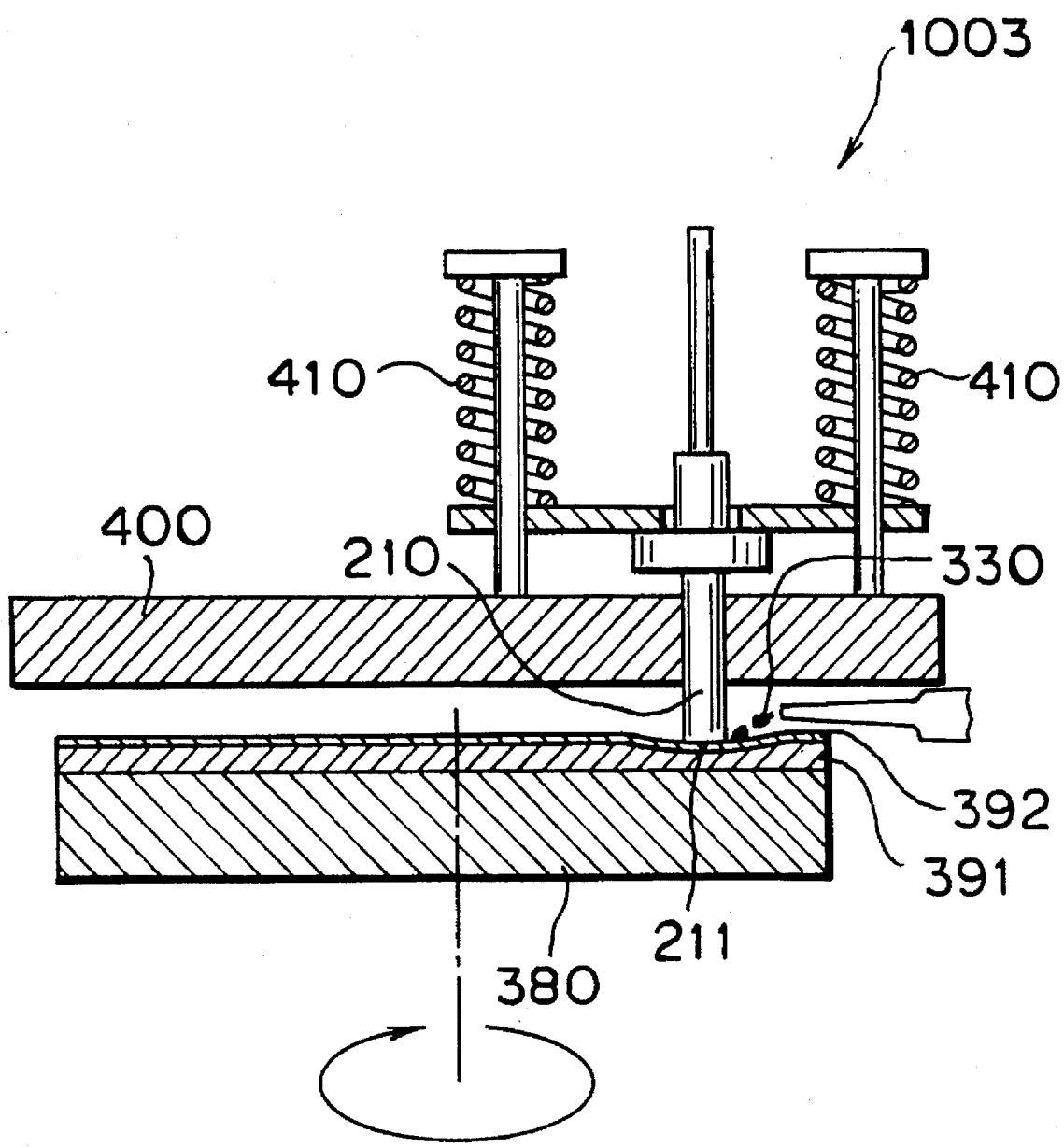
FIG. 4 is a schematic cross sectional view showing a polishing machine according to a third prior art example.
Figure 5:
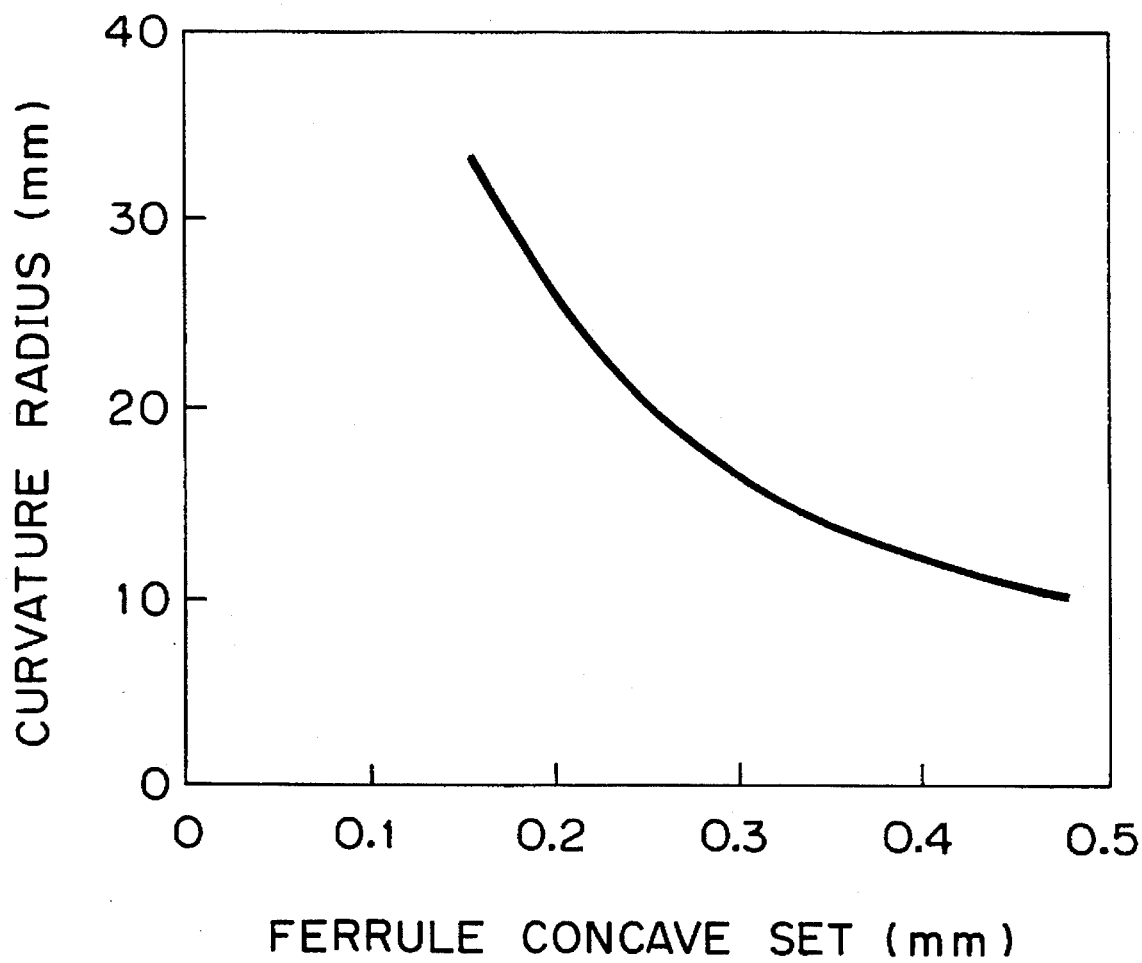
FIG. 5 is a graph illustrating a relationship between the ferrule concave set to a resin film vs. curvature radius of the ferrule end face.

Since, in the present embodiment, it is not necessary to directly detect deformation of the elastic film polisher 12, the embodiment can also be applied to a polishing machine 1003 which, as shown in FIG. 4, cannot directly detect the deformation amount, and which has a rotated polishing plate 380 of a type where a polishing sheet 392 or the like is provided on the upper surface of an elastic member 391 such as rubber.

While in the above-described third to fourth embodiments, explanation has focused on the case where the slide substrate 32 is provided to move the chuck 30, the polishing plate 10 may also be mounted to the rectilinear drive unit 37, or the rectilinear drive unit 36 and the mounting substrate 35 may be mounted symmetrically opposite to each other relative to the slide substrate 32.

Further, in the above embodiments, the voice coil motor is used as the rectilinear drive unit. However, there may be used any other types of rectilinear drive units that are capable of rectilinear driving according to the magnitude of an electrical signal or the like. For example, a screw-fed stage may be used.

According to the third and fourth embodiments as described above, measurements of deformation amounts of the elastic member or moving distance of the slide substrate and positional errors of the ferrule enable both the formation of a high precision convex-curved ferrule end face with good reproducibility, even when errors occur in the insertion position or length at the ferrule, and also the option of controlling the polishing pressure merely by varying the moving distance of the slide substrate. Therefore, when changing the curvature radius, it is unnecessary to replace mechanical parts as required for prior art polishing machines. Thus any curvature radius can be obtained easily.

Further, since movement of the ferrule and application of polishing pressure can be electrically controlled, the embodiment is suitable for automated polishing, improves the ferrule polishing efficiency, and provides a convex-curved ferrule with good reproducibility and minimized fluctuation.

Embodiment 5

Figure 10:
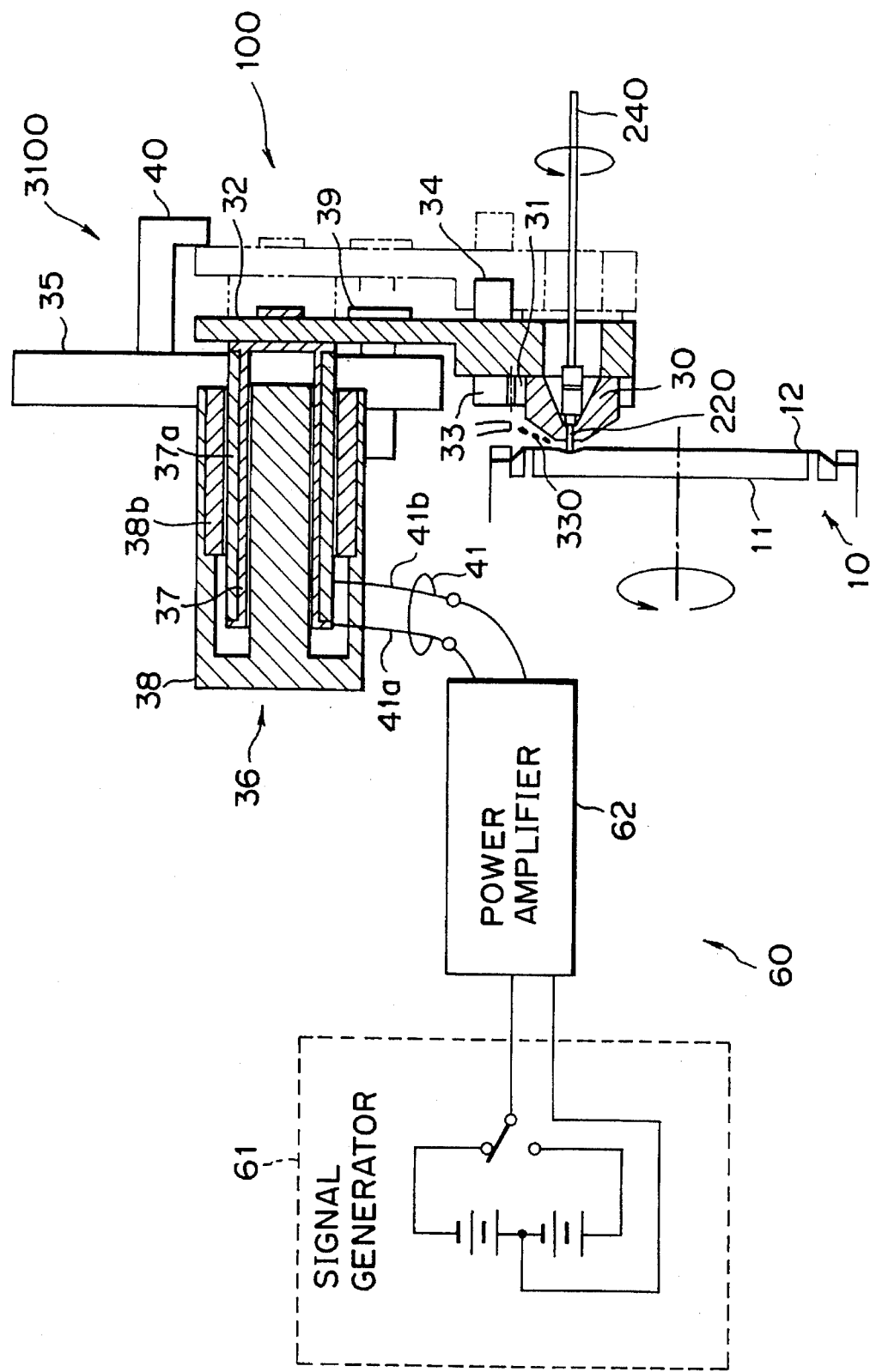
FIG. 10 is a schematic cutaway cross sectional view showing the structure of a constant pressure control polishing apparatus according to a fifth embodiment of the present invention.

FIG. 10 is a partly cutaway schematic view showing a constant pressure control ferrule end face polishing apparatus 3100 according to the fifth embodiment. Similar parts to those used in FIGS. 8 and 9 are indicated by similar reference symbols, and detailed description thereof is omitted here.

The polishing apparatus 3100 of the fifth embodiment has a constant pressure control mechanism 100 driven by the voice coil motor (VCM) 36 as a rectilinear drive mechanism. The constant pressure control mechanism 100 mainly comprises the slide substrate 32, the chuck 30, and the motor 34, and arrangement of these components and construction of the voice coil motor 36 are the same as in the third and fourth embodiments.

The fifth embodiment differs from the third and fourth embodiments in a control unit 60 for controlling the voice coil motor 36. The control unit 60 of the fifth embodiment comprises a signal generator 61 for generating a concave force signal, and a power amplifier 62 for amplifying the signal of the concave force signal generator 61.

With the above construction, the polishing apparatus 3100 operates as follows.

The constant pressure control mechanism 100 attaches and detaches the ferrule 220 to and from the chuck 30 at the position (hereinafter referred to as retreat position) indicated by the two-dot chain lines in FIG. 10.

To move the constant pressure control mechanism 100 to the retreat position, a current is applied by a command signal from the concave force signal generator 61 through the current amplifier 62 from the drive line 41a to the drive line 41b of the coil 37a of the VCM 36 to press the slide substrate 32 against the stopper 40 mounted on the mounting substrate 35.

At the retreat position, the ferrule 220 mounted at the tip of the optical cable 240 is inserted into the chuck 30 by clamping.

Then, a new command signal (a concave force to deform the film 12 spread on the polishing plate 10 so that a specified curvature radius can be formed, previously determined by experiments or the like) is generated from the concave force signal generator 61, applied from the drive line 41b to 41a of the bobbin 37 of the VCM 36 through the power amplifier 62, and the constant pressure control mechanism 100 is moved in the direction of the polishing plate 10 to press the tip of the ferrule 220 against the film 12.

As a result, the tip of the ferrule 220 is pushed against the film 12 to a position where the force generated by the VCM 36 is balanced with the opposing force generated by the elastic deformation of the film polisher 12. The force generated by the VCM 36 is quantitatively determined by a flux density of a magnet 38b, the number of turns of the coil 37a, and the current flowing through the coil 37a.

Further, the polishing plate 10 is rotated, the chuck 30 is rotated by the motor, and the abrasive liquid 330 is supplied to polish the end face of the ferrule 220 to a convex-curved shape. At this moment, the ferrule 220 is pressed against the film 12 always at a constant pressure.

Embodiment 6

Figure 11:
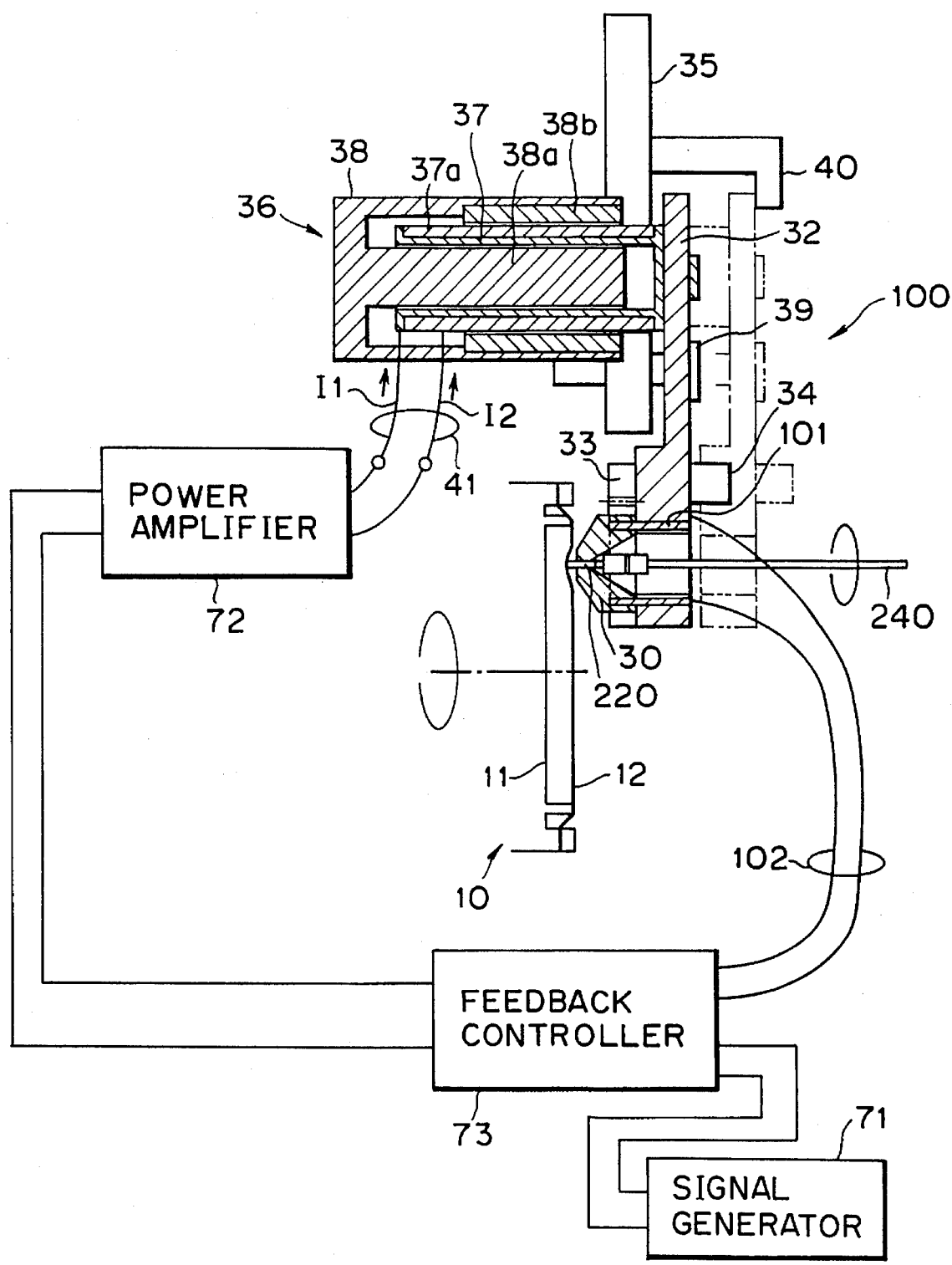
FIG. 11 is a schematic cutaway cross sectional view showing the structure of a constant pressure control polishing apparatus according to a sixth embodiment of the present invention.

FIG. 11 is a schematic partly cross sectional view showing a constant pressure polishing apparatus 3200 according to a sixth embodiment of the present invention.

Parts in FIG. 11 having the same reference numerals as in FIG. 10 of a fifth embodiment have the same functions as in the fifth embodiment. A control unit 70 has a feedback controller 73 between a signal generator 71 and a power amplifier 72. The feedback controller 73 is connected to a concave force detector 101 by a signal line 102, and a command amount from the concave force signal generator 71 is subtracted from a detection signal from the signal line 102 to output a corrected concave force to the power amplifier 72 as necessary.

With the above construction, the sixth embodiment operates as follows.

The constant pressure control mechanism 100 attaches and detaches the ferrule 220 to and from the chuck 30 at the position (hereinafter referred to as retreat position) indicated by the two-dot chain lines in FIG. 11.

To move the constant pressure control mechanism 100 to the retreat position, a current is applied by a command signal from a concave force signal generator 71 through a current amplifier 72 from the drive line 41a to 41b of the coil 37a of the VCM 36 to press the slide substrate 32 against the stopper 40 mounted on the mounting substrate 35.

At the retreat position, the ferrule 220 mounted at the tip of the optical cable 240 is inserted into the chuck 30 so that the optical cable 240 can be claimed by the chuck 30.

Then, a new command signal (a concave force to deform the film polisher 12 spread on the polishing plate 10 so that a specified radius can be formed, previously determined by experiments or the like) is generated from the concave force signal generator 71, applied from the drive line 41b to 41a of the coil 37a of the VCM 36 through the power amplifier 72, and the constant pressure control mechanism 100 is moved in the direction of the polishing plate 10 to press the tip of the ferrule 220 against the film 12.

As a result, the tip of the ferrule 220 is pushed in the film 12 to a position where the force generated by the VCM 36 is balanced with the repulsive force due to elastic deformation of the film 12.

The concave force is detected by the concave force detector 101, and the command amount from the concave force signal generator 71 is subtracted from the detection signal outputted through the signal line 102 by the feedback controller 73.

At this moment, when a correct concave force is not applied to the film due to either of a tension variation of the optical cable 240, variations in current-force characteristics of the VCM 36, or the like, the variation force (the command value of the concave force signal generator 71 subtracted by a value detected by the concave force detector 101) is calculated by the feedback controller 73, and the calculated signal (correcting force to the concave force) is power amplified by the power amplifier 72, and then sent to the VCM 36 to correct the concave force.

Figure 12:
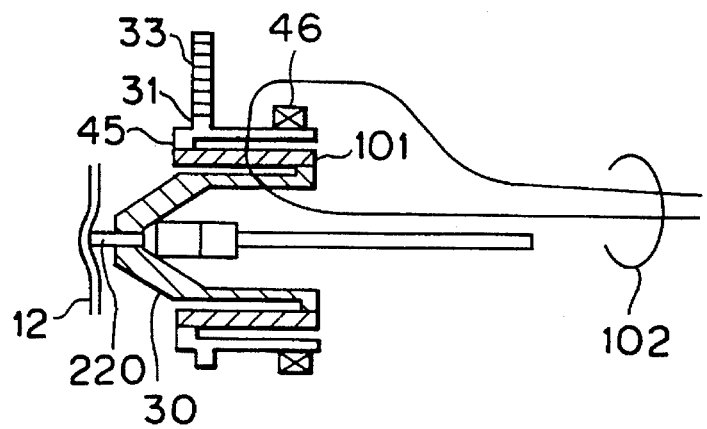
FIG. 12 is a schematic cross sectional view showing a practical example of a chuck in the constant pressure control polishing apparatus according to the sixth embodiment of the present invention.

FIG. 12 is a schematic cross sectional view showing the chuck 30 and the concave force 101 used in the sixth embodiment.

The chuck 30 is incorporated in a chuck holding mechanism 45. The holding mechanism 45 is rotatably mounted to the slide substrate 32 through a ball bearing 46. A gear 31 is provided on the outer periphery of the holding mechanism 45, which engages with a gear 33 connected to the motor 34.

Referring to FIG. 12, the chuck 30 clamping the ferrule 220 to be polished is rotated by the motor 34 and the gears 33 and 31.

To detect the ferrule concave force during polishing, the concave force detector 101 is mounted so that it is inscribed on the chuck holding mechanism 45 and circumscribed on the chuck 30.

With the above construction, the concave force of the ferrule 220 to the film 12 can be detected even when the chuck 30 is rotating, and the detection signal is taken out through the signal line 102.

Figure 13A:
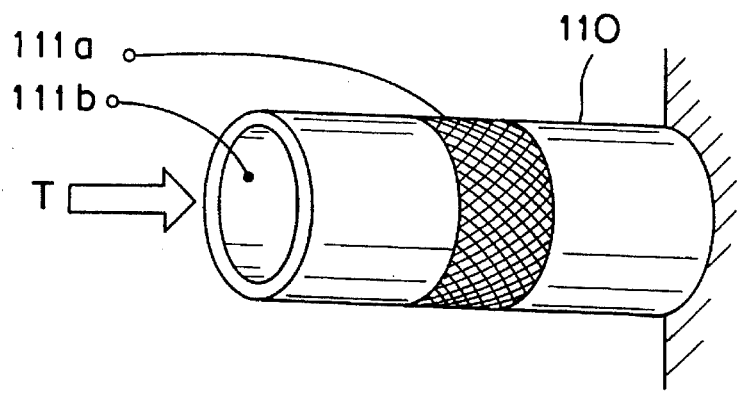
FIG. 13A is a schematic view showing a first practical example of the concave force detector in the constant pressure control polishing apparatus according to the sixth embodiment of the present invention.
Figure 13B:
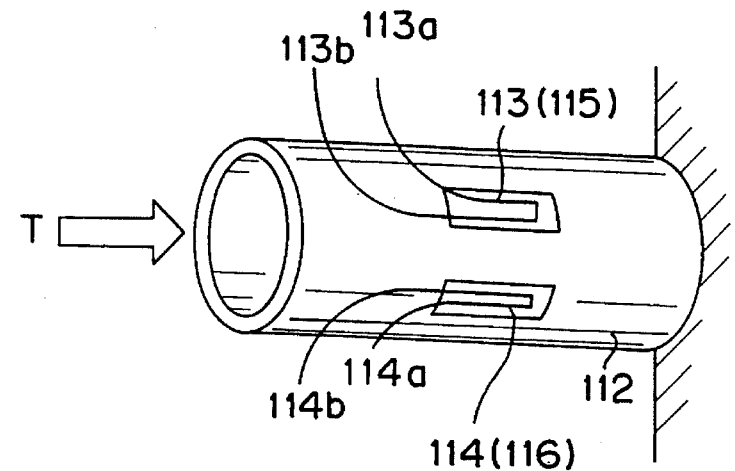
FIG. 13B is a schematic view showing a second practical example of the concave force detector in the constant pressure control polishing apparatus according to the sixth embodiment of the present invention.

FIGS. 13A and 13B show practical examples of the concave force detector 101.

FIG. 13A shows an example of the concave detector using a cylindrical piezo element 110 as a detection element, which comprises an inner peripheral conductor 111a and an outer peripheral conductor 111b.

As shown in FIG. 13A, when a concave force T is applied from the left end of the cylindrical piezo element fixed at the right end, a voltage nearly proportional to the concave force is generated on the inner and outer surfaces of the cylindrical piezo element 110.

The voltage can be taken out through detection lines 111a and 111b (for further detailed detection mechanism, refer to Kenji Uchino: "Piezoelectric/Electrostrictive Actuators", Morikita Publishing, p.101).

FIG. 13B shows a second example of the concave force detector 101, which uses a strain gauge as a detection element.

Figure 14:
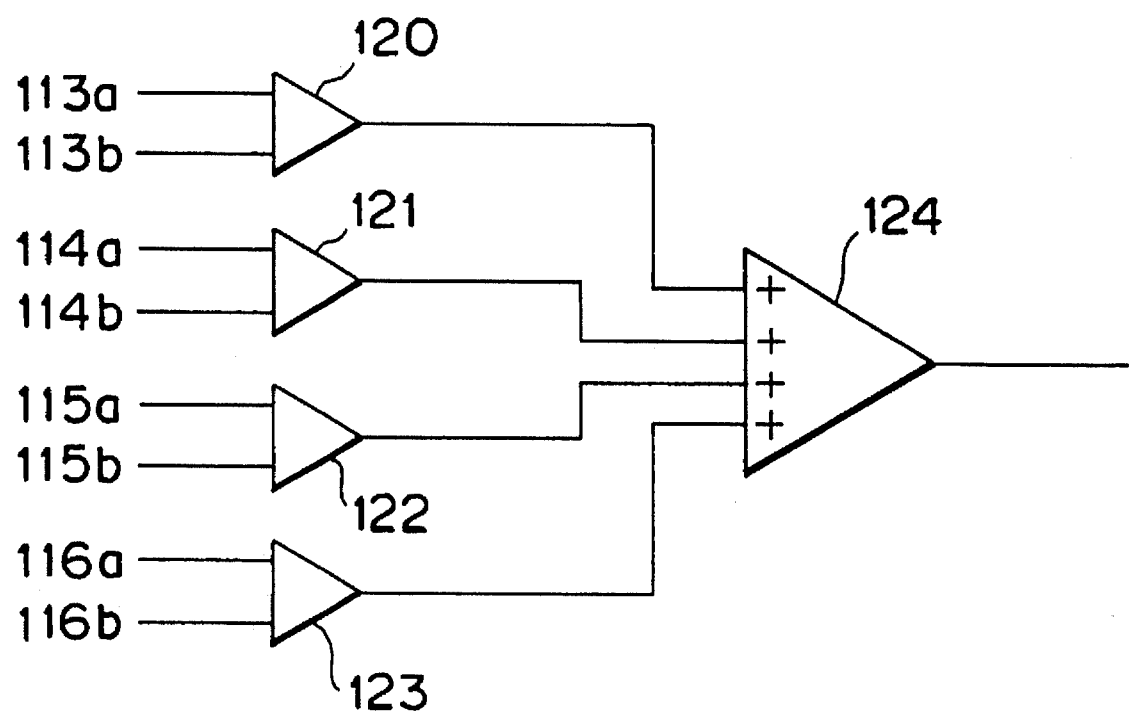
FIG. 14 is a schematic view showing a detection circuit for operating the concave force detector shown in FIG. 13B.

As shown in FIG. 13B, a first strain gauge element 113 and a second strain gauge element 114 are mounted on the outer peripheral surface of a cylinder. The first and second strain gauges 113 and 114 are connected to detection lines 113a, 113b, and 114a, 114b respectively. Further, third and fourth strain gauges 115 and 116 (not shown) are disposed at positions symmetrical to the first and second strain gauge elements 113 and 114 with respect to the central axis. The third and fourth strain gauges 115 and 116 are connected to detection lines 115a, 115b and 116a, 116b, respectively. FIG. 14 shows a detection circuit used for the second example.

As shown in FIG. 14, strain gauge amplifying circuits 120 to 123 for the individual strain gauge elements 113 to 116 are provided, which are connected to a 4-input addition circuit 124. The individual strain gauge amplifying circuits 120 to 123 are connected with the detection lines 113a, 113b, to 116a, 116b of the individual gauge elements 113 to 116 as shown in FIGS. 13 and 14 respectively.

With the detector of the above construction, referring to FIG. 13B, when a concave force T is applied from the left end of a cylinder 112 fixed at the right end, the cylinder 112 slightly shrinks due to a compressive force.

The amount shrinkage of can be detected by the four strain gauges 113 to 116. The four strain gauge output signals are amplified by the strain gauge amplifying circuits 120 to 123 corresponding to the individual strain gauges, inputted to the 4-input addition circuit 124, and a voltage proportional to the concave force is detected from the addition signal.

In the second example of the concave force detector 101, the concave force is detected from an addition signal of four strain gauges.

Therefore, even though a force other than the axial force to the cylinder of the detector may be present, for example, a tumbling force, generates, such a tumbling force is canceled between a pair of strain gauges, since strain of the cylinder due to the tumbling force becomes an expansion or shrinkage strain with respect to the central axis, and such a tumbling force is not misdetected as a concave force.

As described above, in the fifth and sixth embodiments of the present invention, the use of the VCM 36 for generating a polishing pressure enables obtaining a constant force even when the end of the ferrule 220 is pressed against the film 12 this pressing any position, if it is within a moving stroke range of the bobbin 37. Thus, polishing of a constant radius can be achieved independent of a length error of the ferrule 220 or a positional error due to the chuck 30.

As an example, when a plurality of ferrules were polished in the prior art example 2, polishing was achieved with a precision of ±1 mm to the setting value of the curvature radius.

On the other hand, in the sixth embodiment where the VCM 36 is controlled by the concave force detection signal, variations in concave force due to optical cord tension and friction of the rectilinear guide mechanism for the mounting substrate can be detected and corrected, and, hence, a polishing machine can be provided which is suitable for precision polishing of analog communication optical ferrules and the like.

With the above described arrangement that the ferrule is mounted to the moving bobbin of the VCM, and a constant polishing pressure is applied by the VCM output, the constant pressure polishing apparatus according to the fifth and sixth embodiments of the present invention have the following advantages:

(1) the ferrule can be polished with a constant pressure independent of ferrule length and chuck errors, and convex-curved polishing is possible with good repeatability and reduced deviation;

(2) the polishing pressure can be controlled merely by varying the current applied, and a desired curvature radius can be obtained in the simplified manner without requiring replacement of mechanical parts as required for changing the curvature radius in the prior art;

(3) since movement of the ferrule and application of the polishing pressure can be achieved by electrical control, the structure is suitable for automation of polishing;

(4) further, in the sixth embodiment where the VCM is controlled by the concave force detection signal, there can be achieved a polishing machine suitable for precision polishing for analog optical communications since variations in the concave force due to optical cable tension and mounting substrate rectilinear guide mechanism can be detected and corrected.

Therefore, as described above in detail, the present invention can provide a constant pressure control polishing apparatus which can polish the ferrule end face with high precision and improved workability and reproducibility.

The present invention has been described in detail with respect to preferred embodiments, and changes and modifications thereto may be made without departing from the invention in its broader aspects, and it is the intention, therefore, in the appended claims to cover all such changes and modifications as fall within the true spirit of the invention.

What is claimed is:

1. A polishing plate adapted to be rotated for polishing an end face of an optical fiber connector ferrule comprising:

a disc-shaped substrate having a polishing surface including an outer ring area, an inner ring area disposed radially inwardly with respect to the outer ring area, and an inner portion disposed radially inwardly with respect to the inner ring area;

a ring grinding wheel disposed on the outer ring area of the surface of the substrate for forming an adhesive removing ring area;

a first elastic film polisher disposed in a region defined by the inner ring area of the surface of the substrate and at a distance from the surface of the substrate, the first elastic film polisher forming a rough polishing ring area; and a second elastic film polisher disposed in a region defined by the inner portion of the surface of the substrate and at a distance from the surface of the substrate, the second elastic film polisher forming a final polishing ring area.

2. The polishing plate according to claim 1, wherein:

the first elastic film polisher and the second elastic film polisher constitute an integral circular film polisher; and the substrate further includes a protrusion thereon for supporting a boundary between the rough polishing ring area and the final polishing ring area.

3. The polishing plate according to claim 2, wherein the substrate comprises:

a cylindrical polishing plate having an inner opening and disposed such that the circular film polisher extends across the inner opening thereof, the cylindrical polishing plate defining the first ring area of the substrate, the ring grinding wheel thereby being disposed on the cylindrical polishing plate; and a circular polishing plate engaging the cylindrical polishing plate, the circular polishing plate defining the inner ring area and the inner portion of the substrate.

4. The polishing plate according to claim 2, wherein the circular film polisher includes an annular projection on a surface thereof for further delimiting the boundary between the rough polishing ring area and the final polishing ring area.

5. The polishing plate according to claim 4, wherein:

the inner portion is a first inner portion;

the annular projection is a first annular projection;

the substrate further includes a second inner portion disposed radially inwardly with respect to the first inner portion; and the circular film polisher further includes a second annular projection on the surface thereof for delimiting a boundary between the final polishing ring area and the second inner portion of the substrate.

6. The polishing plate according to claim 4, wherein:

the inner portion is a first inner portion:

the substrate further includes a second inner portion disposed radially inwardly with respect to the first inner portion; and the circular film polisher further includes a disc-shaped projection on the surface thereof for covering the second inner portion of the substrate.

7. A constant range polishing apparatus for polishing an end face of an optical fiber connector ferrule comprising:

a polishing plate adapted to be rotated about a polishing plate axis for polishing the end face of the optical fiber connector ferrule including:

a disc-shaped substrate having a polishing surface including an outer ring area, an inner ring area disposed radially inwardly with respect to the outer ring area, and an inner portion disposed radially inwardly with respect to the inner ring area;

a ring grinding wheel disposed on the outer ring area of the surface of the substrate for forming an adhesive removing ring area;

a first elastic film polisher disposed in a region defined by the inner ring area of the surface of the substrate and at a distance from the surface of the substrate, the first elastic film polisher forming a rough polishing ring area; and a second elastic film polisher disposed in a region defined by the inner portion of the surface of the substrate and at a distance from the surface of the substrate, the second elastic film polisher forming a final polishing ring area;

a chuck operatively associated with the polishing plate and adapted to assume a working position for holding the optical fiber connector ferrule opposite the polishing plate, the chuck further being rotatable about an axis of the optical fiber connector ferrule;

a mounting substrate disposed for rotatably supporting the chuck at an end thereof opposing the polishing plate;

a rectilinear drive means having a moving part connected to one of the polishing plate and the mounting substrate for positioning the polishing plate and the mounting substrate relative to one another in a direction defined by the polishing plate axis; and a control system operatively connected to the rectilinear drive means for detecting a relative positional change between the polishing plate and the end face of the optical fiber connector ferrule for activating the rectilinear drive means to correct the relative positional change.

8. The polishing apparatus according to claim 7, wherein the control system comprises:

a concave set signal generator for generating a concave set signal;

a deformation amount signal generator for generating a deformation amount signal corresponding to a deformation amount of the polishing plate by the end face of the optical fiber connector ferrule;

a feedback controller for generating a feedback signal corresponding to a subtraction of the deformation amount signal from the concave set signal;

a current amplifier for converting the feedback signal to a drive current and for supplying the drive current to the rectilinear drive means, the feedback controller thereby controlling a moving distance travelled by the moving part of the rectilinear drive means, the current amplifier, the feedback controller, the deformation amount signal generator, and the concave set signal generator being electrically connected with one another.

9. The polishing apparatus according to claim 7, wherein the control system comprises:

a concave set signal generator for generating a concave set signal;

a moving distance signal generator for generating a moving distance signal corresponding to a moving distance travelled by the moving part of the rectilinear drive means;

a feedback controller for generating a feedback signal corresponding to a subtraction of the moving distance signal from the concave set signal;

a current amplifier for converting the feedback signal to a drive current and for supplying the drive current to the rectilinear drive means, the feedback controller thereby controlling the moving distance travelled by the moving part of the rectilinear drive means, the current amplifier, the feedback controller, the deformation amount signal generator, and the concave set signal generator being electrically connected with one another.

10. The polishing apparatus according to claim 7, wherein the control system comprises:

a concave set signal generator for generating a concave set signal;

a moving distance signal generator for generating a moving distance signal corresponding to a moving distance travelled by the moving part of the rectilinear drive means;

an initial position signal generator for generating an initial position signal corresponding to a distance from the polishing plate to a tip of the end face of the optical fiber connector ferrule when the chuck is in its working position;

an initial position storage circuit for storing the initial position signal;

an adder for adding the initial position signal to the concave set signal for generating a corrected concave set signal;

a feedback controller for generating a feedback signal corresponding to a subtraction of the moving distance signal from the corrected concave set signal;

a current amplifier for converting the feedback signal to a drive current and for supplying the drive current to the rectilinear drive means, the feedback controller thereby controlling the moving distance travelled by the moving part of the rectilinear drive means, the current amplifier, the feedback controller, the moving distance signal generator, the adder, the initial position storage circuit, the initial position signal generator and the concave set signal generator being electrically connected with one another.

11. The polishing apparatus according to claim 7, wherein:

the control system includes means for generating a drive current for activating the rectilinear drive means; and the rectilinear drive means is a voice coil motor including
a magnetic circuit comprising:
a cylindrical casing;
an axis guide disposed at a central region of the cylindrical casing;
a bobbin movable with respect to the cylindrical casing and including a coil wound on an outer periphery thereof, the coil being engaged with the axis guide, the drive current being applied to the coil for controlling a movement of the bobbin with respect to the cylindrical casing.

12. A constant range polishing apparatus for polishing an end face of an optical fiber connector ferrule comprising:

a polishing plate adapted to be rotated about a polishing plate axis for polishing the end face of the optical fiber connector ferrule including:
a disc-shaped substrate having a polishing surface including an outer ring area, an inner ring area disposed radially inwardly with respect to the outer ring area, and an inner portion disposed radially inwardly with respect to the inner ring area;
a ring grinding wheel disposed on the outer ring area of the surface of the substrate for forming an adhesive removing ring area;
a first elastic film polisher disposed in a region defined by the inner ring area of the surface of the substrate and at a distance from the surface of the substrate, the first elastic film polisher forming a rough polishing ring area; and
a second elastic film polisher disposed in a region defined by the inner portion of the surface of the substrate and at a distance from the surface of the substrate, the second elastic film polisher forming a final polishing ring area;

a chuck operatively associated with the polishing plate and adapted to assume a working position for holding the optical fiber connector ferrule opposite the polishing plate, the chuck further being rotatable about an axis of the optical fiber connector ferrule;

a mounting substrate disposed for rotatably supporting the chuck at an end thereof opposing the polishing plate;

a constant pressure control means having a moving part connected to one of the polishing plate and the mounting substrate for positioning the polishing plate and the mounting substrate relative to one another in a direction defined by the polishing plate axis;

a concave set signal generator for generating an concave set signal for controlling a concave set of the constant pressure control means.

13. The polishing apparatus according to claim 12, further comprising:

a concave force generator for generating a concave force signal corresponding to a concave force of the end face of the optical fiber connector ferrule on the polishing plate; and a feedback controller operatively connected to the concave force detector for controlling a drive mechanism of the constant pressure control means in response to the concave force detection signal and the concave set signal.

14. The polishing apparatus according to claim 12, wherein the constant pressure control means comprises a drive mechanism including a voice coil.

15. A method for polishing an end face of an optical fiber connector ferrule comprising the steps of:

rotating a polishing plate including:

a disc-shaped substrate having a polishing surface including an outer ring area, an inner ring area disposed radially inwardly with respect to the outer ring area, and an inner portion disposed radially inwardly with respect to the inner ring area;

a ring grinding wheel disposed on the outer ring area of the surface of the substrate for forming an adhesive removing ring area;

a first elastic film polisher disposed in a region defined by the inner ring area of the surface of the substrate and at a distance from the surface of the substrate, the first elastic film polisher forming a rough polishing ring area; and a second elastic film polisher disposed in a region defined by the inner portion of the surface of the substrate and at a distance from the surface of the substrate, the second elastic film polisher forming a final polishing ring area;

removing an adhesive adhered to the end face of the optical fiber connector ferrule by pressing the end face of the optical fiber connector ferrule against the ring grinding wheel of the polishing plate while supplying the ring grinding wheel with a rough polishing abrasive liquid thereby producing an adhesive free end face of the optical fiber connector ferrule;

rough polishing the adhesive free end face of the optical fiber connector ferrule by pressing the adhesive free end face of the optical fiber connector ferrule against the first elastic film polisher of the polishing plate while supplying the first elastic film polisher with the rough polishing abrasive liquid thereby producing a rough polished end face of the optical fiber connector ferrule;

final polishing the rough polished end face of the optical fiber connector ferrule by pressing the rough polished end face of the optical fiber connector ferrule against the second elastic film polisher of the polishing plate while supplying the second elastic film polisher with a final polishing abrasive liquid thereby producing a polished end face of the optical fiber connector ferrule.

16. The method according to claim 15, wherein:

the first elastic film polisher and the second elastic film polisher constitute an integral circular film polisher; and the substrate further includes a protrusion thereon for supporting a boundary between the rough polishing ring area and the final polishing ring area.

17. The method according to claim 15, wherein the steps of removing and rough polishing include the step of supplying the rough polishing abrasive liquid along a projection disposed at a boundary between the rough polishing ring area and the final polishing ring area.

18. The method according to claim 15, wherein the step of final polishing includes the step of supplying the final polishing abrasive liquid along a projection disposed radially inwardly with respect to the final polishing ring area.

* * * * *